March 19, 1935.  A. F. FROUSSARD  1,994,510
SHOE SOLE MACHINE
Filed April 23, 1932   3 Sheets-Sheet 1
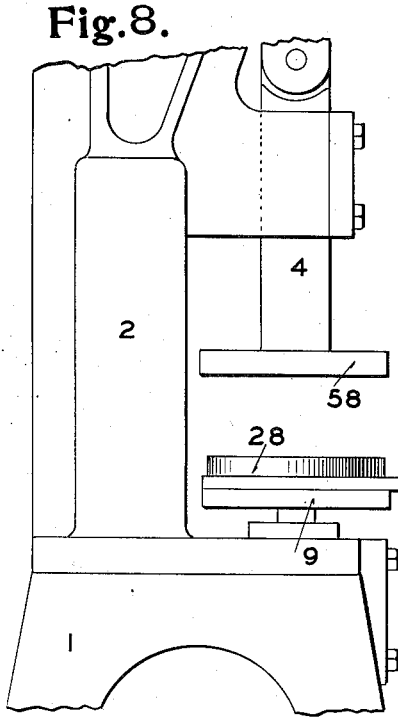
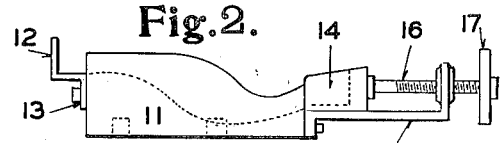
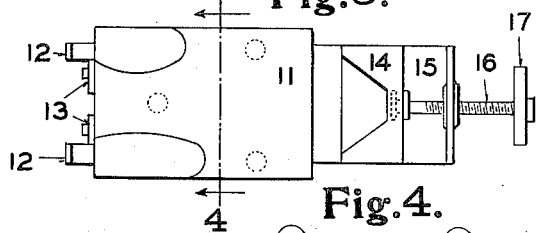
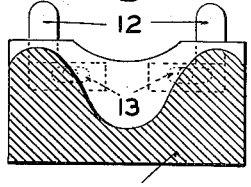
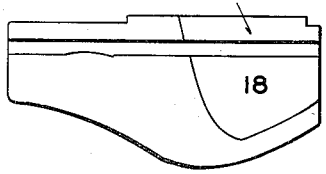
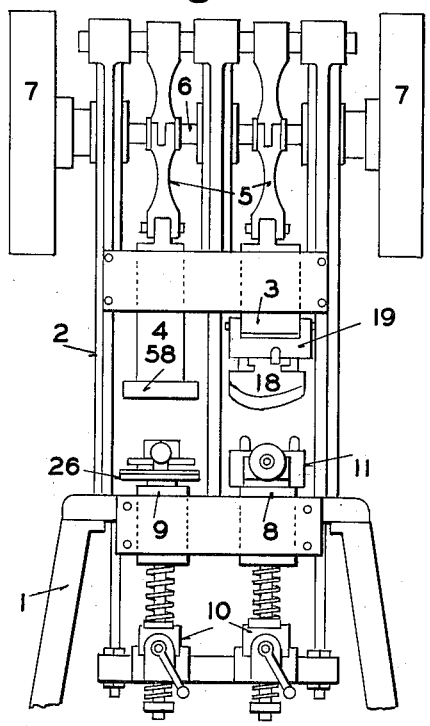
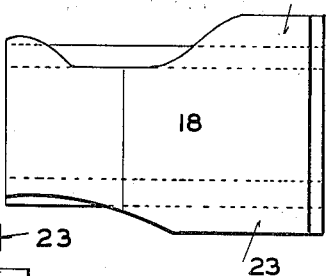
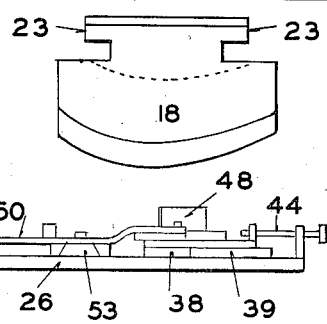
Inventor
A. F. Froussard
By E. E. Huffman
Att'y.

March 19, 1935.  A. F. FROUSSARD  1,994,510
SHOE SOLE MACHINE
Filed April 23, 1932    3 Sheets-Sheet 2

Inventor
A. F. Froussard
By E. E. Huffman
Att'y.

March 19, 1935.  A. F. FROUSSARD  1,994,510
SHOE SOLE MACHINE
Filed April 23, 1932  3 Sheets-Sheet 3
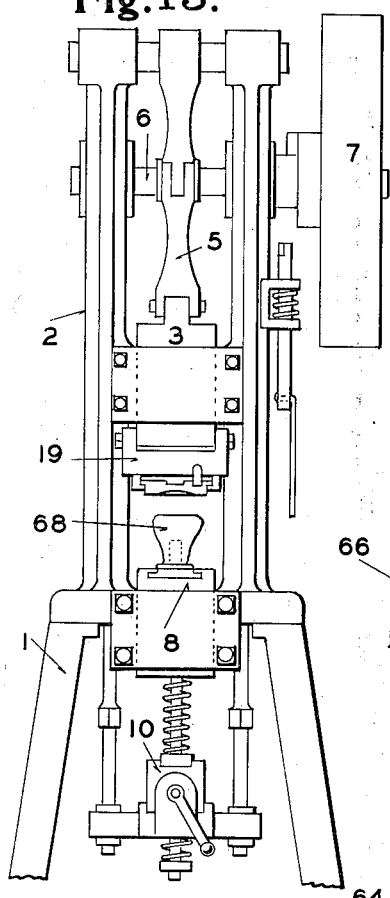
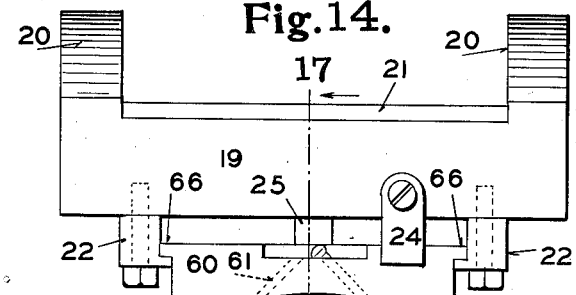
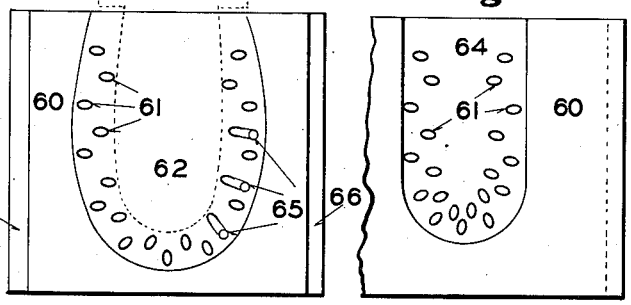
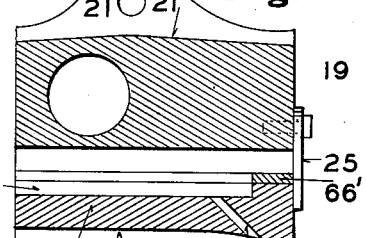
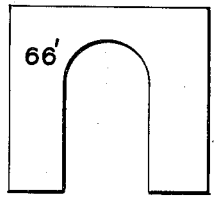
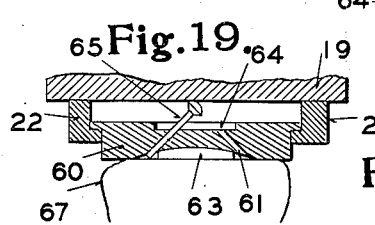
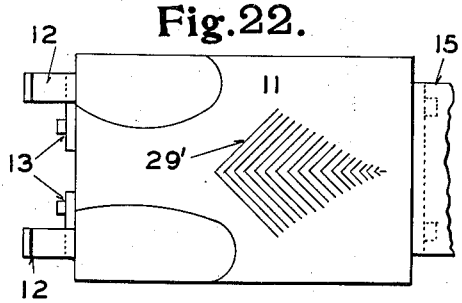
Inventor
A. F. Froussard
By E. G. Huffman
Att'y.

Patented Mar. 19, 1935

1,994,510

UNITED STATES PATENT OFFICE 1,994,510

SHOE SOLE MACHINE

Albert F. Froussard, St. Louis, Mo.

Application April 23, 1932, Serial No. 607,078

9 Claims. (Cl. 12—40)

My invention relates to a shoe sole machine and particularly to a machine for impressing a design on the face of the sole; for shaping the sole; and for pressing and stretching the material of the upper around the rear end of the sole to insure a proper seat for the reception of the heel.

Figure 9:
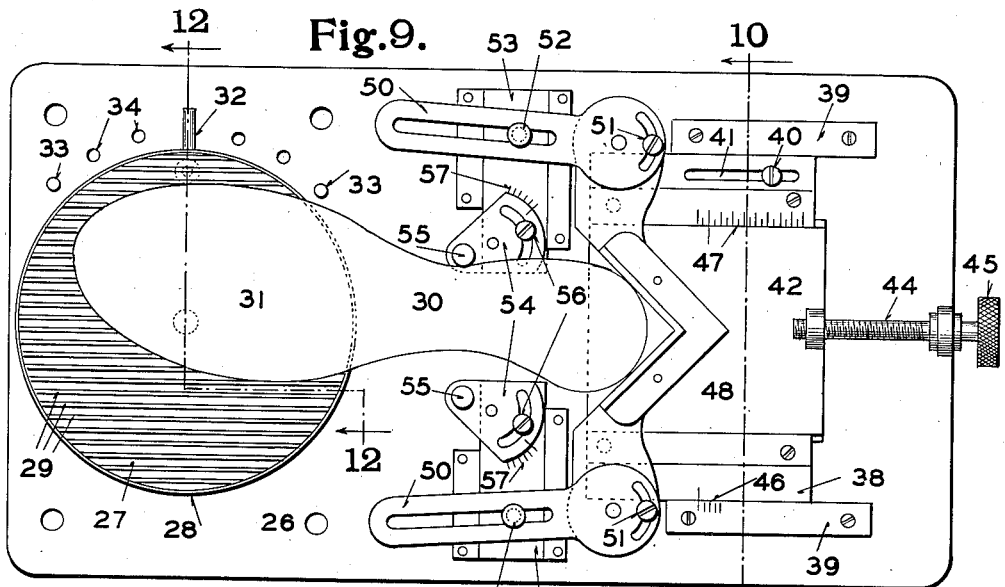
Figure 10:
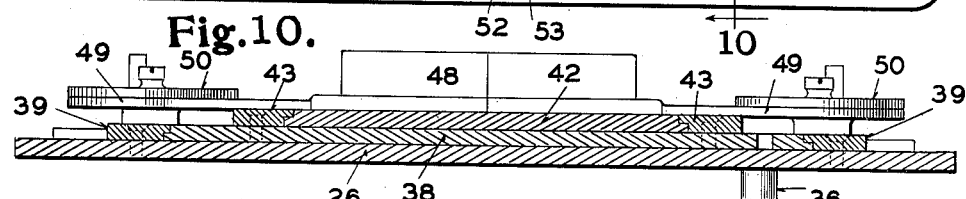
Figure 11:
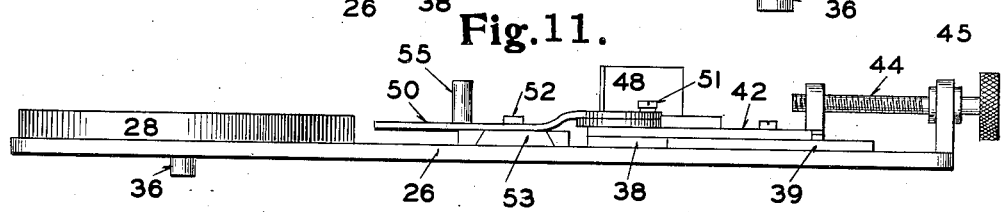
Figure 12:
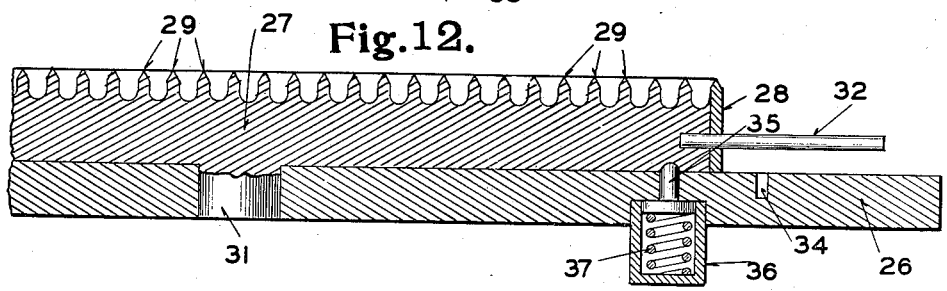

In the accompanying drawings, which illustrate mechanism made in accordance with my invention, Figure 1 is a front elevation of a duplex press provided with means for impressing and shaping the sole; Figure 2 is a side elevation of the lower shaping die; Figure 3 is a top plan view of the lower shaping die; Figure 4 is a section taken on the line 4—4 of Figure 3; Figure 5 is a side elevation of the upper shaping die; Figure 6 is a top plan view of the upper shaping die; Figure 7 is a front elevation of the upper shaping die; Figure 8 is an enlarged side view of a portion of the press shown in Figure 1; Figure 9 is an enlarged top plan view of the impressing die and gauge shown in Figure 8; Figure 10 is a section taken on the line 10—10 of Figure 9; Figure 11 is side elevation of the parts shown in Figure 9; Figure 12 is an enlarged section taken on the line 12—12 of Figure 9; Figure 13 is a front view of a single press provided with means for pressing and stretching the upper; Figure 14 is an enlarged front elevation of the die and holder shown in Figure 13; Figure 15 is a bottom view of the die shown in Figure 14; Figure 16 is a top plan view of the die shown in Figure 14; Figure 17 is a section taken on the line 17—17 of Figure 14; Figure 18 is a plan view of a plate for limiting the movement of the die; Figure 19 is a diagrammatic view illustrating the manner of stretching the upper; Figure 20 is a side elevation of the last shown in Figure 13; Figure 21 is a top plan view of the last; and Figure 22 is a view showing a modification of the lower shaping die.

Referring first to Figure 1, the press comprises a base 1 and a frame 2 mounted thereon. The press, which is duplex, is provided with two plungers 3 and 4, respectively. The plungers are reciprocated by toggle mechanism 5 operated from a shaft 6 drawn by belt wheels or pulleys 7. The plungers cooperate with dies, lasts, or the like carried on supports 8 and 9 which may be adjusted by raising and lowering mechanism 10, not described in detail as it, like the general construction of the press, is similar to that described in Patent No. 1,846,029 granted to me February 23, 1932.

Carried on the support 8 is the lower shaping die formed of a block 11, the upper face of which is recessed to conform to the shape which it is desired to impart to the shank of the shoe sole before attaching it to the shoe. In order to properly position the sole over the die 11, I provide the die with a pair of side stops 12, adjustable laterally by means of slotted connections 13, and a toe stop 14. The stop 14 is slidingly mounted on a bracket 15 and is adjusted toward and away from the die to accommodate soles of varying length by means of a threaded rod 16 having on its end a hand wheel 17. Cooperating with the lower die 11 is an upper die 18, the lower face of which is shaped to conform to the upper face of the said die 11. The die 11 is removably mounted on the lower face of a yoke 19 carried on the plunger 3. This yoke (shown in detail in Figures 14 and 17) is pivoted to the plunger by trunnions passing through lugs 20 and has an upper face 21 of slightly convex form to permit of a slight rocking movement to allow the die carried thereby to conform to the cooperating die carried on the support 8. Secured to the lower face of the yoke are a pair of flanged bars 22 forming ways to receive flanges 23 on the die 18. The die is held against longitudinal movement by front and rear buttons 24 and 25, respectively, which allow of ready removal or insertion of the die.

Carried on the support 9 is a plate 26 forming the base of the impressing die and gauge, shown in detail in Figures 9 to 12. Rotatably mounted on the rear end of the plate is a circular die comprising a disc 27 and a surrounding band 28. The upper edge of the latter is made V-shaped to provide an edge for impressing an arcuate indentation across the shank of the sole 30 to provide a break line to assist in the shaping of the sole by the dies 11 and 14 heretofore described. The upper face of the disc is fluted to provide a series of parallel indenting edges 29 for forming a pattern on the face of the sole 30. The direction of the lines of the pattern with relation to the sole may be varied by rotating the disc on its trunnion 31. This may be accomplished by means of a handle 32, the movement of which is limited by stop pins 33, the position of which may be varied by placing them in different holes 34 in the plate 26. After the die is positioned, it is locked in place by a detent 35 (Figure 12) carried in a casing 36 and forced into engagement with recesses corresponding to the position of the pins by a spring 37.

To position soles of different length, width, and style on the die, I provide a gauge on the front end of the plate 26, as shown in Figure 12. 38 is a slide moving between guide bars 39 and adapted to be secured in position by a screw 40 passing through a slot 41 into the plate 26. Mounted on the slide 38 is a second slide 42 moving between guide bars 43. This slide is adjusted by means of a threaded rod 44 having a knurled head 45. The movement of the slide 38 relative to the plate 26, is indicated by a width scale 46, and that of the slide 42 relative to the first slide, by a length scale 47. Carried on the slide 42 is a V-shaped stop 48 in engagement with the heel end of the sole 30. This stop is provided with a pair of laterally projecting wings 49 to each of which is pivoted a slotted arm 50 adapted to be secured at a greater or less inclination to the direction of travel of the slide by a clamping screw 51. The slot in each of the arms 50 has sliding engagement with a pin 52 carried by a cross slide 53. Pivoted to the inner end of each of the slides 53 is a plate 54 carrying a stop pin 55 for engagement with one edge of the sole. The plates 54 are secured in position by lock screws 56 and are set by means of width scales 57.

In using the impressing device, the heel end of the sole is placed in the V-shaped stop 48 while one edge rests against one of the stop pins 55. Soles for left foot shoes will rest against the pin, as shown in Figure 9, while soles for right foot shoes will contact with the other pin. After the sole is properly positioned on the die, it is forced against it by a platen 58 carried by the plunger 4 to impress on its lower face a break line and a series of parallel indentations, the direction of which may be varied by rotating the die. By making two impressions on each sole, the die being partially rotated between impressions, a pattern of crossing lines is produced. If the die is rotated through an angle of 90 degrees, a pattern of squares is produced. If the die is rotated through a smaller angle, a pattern of lozenges is produced. To set the gauge, scale 47 is set to the desired length and scales 46 and 57 to the desired width, after which the angle of the arms 50 is adjusted to locate the break line. The gauge may then be used for other widths and lengths of the same style of sole by the proper setting of scales 46, 47 and 57.

Often when the heel portion of the counter is pressed to form a heel seat, an incomplete seat is formed so that the heel projects slightly beyond the seat at one or more points in its periphery, thus detracting from the appearance of the finished shoe. Heretofore it has been the practice for the workman applying the heel, to remedy such defects by stretching portions of the heel counter outwardly by the use of a hand tool applied at the places where the defects occur. This hand operation (known as "awling") consumes much time and so adds materially to the cost of manufacture. By means of the apparatus shown in Figures 13 to 19, I accomplish this result simultaneously with the heel pressing operation. While my heel stretching device may be used in a duplex press shown in Figure 1, for convenience of illustration I have shown it in connection with a single press as in Figure 13. It consists of a die 60 of the usual form but having formed therein one or more rows of inclined pin holes 61, the lower ends of which terminate near the edges of the recess 62 in the lower face of the die to receive the tongue 63 (Figure 19) of the heel. The upper ends of the pin holes terminate in a recess 64 in the upper face of the die, which recess is of sufficient depth to accommodate the heads of pins 65. The thickness of the flanges 66 on the die is less than the depth of the ways formed by the bars 22 so that the die is capable of vertical movement relative to the plunger. To vary the amount of the movement any suitable stop mechanism may be used. In Figures 17 and 18 I have shown a filler plate 66' for this purpose. By using a number of plates of different thickness any desired variation in the relative movement of the parts may be secured.

In using my stretching device pins 65 are placed in the pin holes 61 at the point or points where stretching of the counter is necessary to complete the heel seat and the heel is pressed in the usual manner. When the projecting ends of the pins come in contact with the counter 67, the pins are raised to the position shown in Figure 19. Further travel of the plunger forces the pins downwardly and outwardly to stretch the counter at the necessary places to provide a complete heel seat, after which the seat is pressed in the usual manner. As in shoes of the same style, the necessity for stretching always occurs at the same point or points, it is only necessary to change the position of the pins when a different style of shoe is to be operated on.

Shoes are often provided with ornamental straps, the ends of which extend between the heel and the counter. To accommodate these ends and prevent the formation thereby of projecting ridges, I provide a last 68 (as shown in Figures 20 and 21) having on its upper surface grooves 69 for their reception. In this manner I provide a substantially flat surface upon which the pressing die may operate.

In using my machine the shoe sole first has a design impressed upon its lower face by the action of the die 27. The sole is then shaped between the dies 11 and 18, this operation being facilitated by the formation of the break line across the shank of the sole by the band 28. The sole may now be secured to the upper, by stretching or otherwise, with greater rapidity and accuracy than would be possible without the preliminary shaping of the sole. After the sole has been attached its rear end is trimmed to provide a tongue 63. This may either be done by hand or by a trimming die such as described in my prior patent above referred to. The shoe is now pressed to form the heel seat, the necessary stretching of the counter being accomplished at the same time, as above described.

In some instances it may be found expedient to omit the operation of the impressing die 27. In this case a raised design 29' may be formed on the concave surface of the die 11, as shown in Figure 22, so as to impress a design on the sole of the shoe at the same time that the sole is shaped.

Having fully described my invention, what I claim as new and desire to secure by Letters Patent of the United States is:

1. In a device of the class described, the combination with a work support, of a reciprocating plunger cooperating therewith, a sole impressing die carried by said support, said die having its face fluted and being provided with a curved break-line forming edge extending transversely of said flutes, adjustable guiding means for positioning a shoe sole with respect to the break-line, and a platen carried by the plunger and cooperating with the die.

2. In a device of the class described, the combination with a work support, of a plunger cooperating therewith, a rotatable sole impressing die carried by said support, said die comprising a peripheral break line forming edge and an interior sole pattern, and a platen carried by said plunger and cooperating with said die.

3. In a device of the class described, the combination with a work support, of a reciprocating plunger cooperating therewith, an impressing die carried by said support; and a gauge for said die, said gauge comprising a stop engaging the heel end of the sole and movable toward and away from the die, and a pair of side stops adjustable laterally by the movement of said first named stop, one of said side stops cooperating with one side of a right foot sole and the other with the opposite side of a left foot sole.

4. In a device of the class described, the combination with a work support, of a plunger cooperating therewith, an impressing die carried by said support; and a gauge for said die, said gauge comprising a slide movable toward and away from the die, a stop carried by said slide for the end of a sole, a laterally movable member, a stop for the side of the sole carried by said member, and an adjustably inclined arm for variably actuating said member from said slide.

5. In a device of the class described, the combination with a work support, of a reciprocating plunger cooperating therewith, an impressing die carried by said support; and a gauge for said die, said gauge comprising a slide movable toward and away from the die, a second slide carried by said first named slide, a stop for the end of a sole on said second named slide, a pair of lateral stops, one of said lateral stops cooperating with one side of a right foot sole and the other with the opposite of a left foot sole, and connections between said second named slide and said lateral stops for automatically shifting the latter through the movement of the former.

6. In a device of the class described, the combination with a work support, of a plunger cooperating therewith, an impressing die carried by said support; and a gauge for said die, said gauge comprising a slide movable toward and away from the die, a stop carried by said slide for the end of a sole, a laterally movable member, a stop for the side of the sole carried by said member, an adjustable arm carried by said slide and having sliding engagement with the laterally movable member, and means for varying the angle of said arm to vary the amount of movement imparted to said member.

7. In a device of the class described, the combination with a work support, of a plunger cooperating therewith, an impressing die carried by said support; and a gauge for said die, said gauge comprising a slide movable toward and away from the die, a second slide carried by said first named slide, a stop for the end of a sole on said second named slide, a laterally movable slide, an adjustable slotted arm carried by said second named slide and engaging with said lateral slide, and a side stop adjustably mounted on said lateral slide.

8. In a device of the class described, the combination with a work support, of a plate mounted on said support and provided with a fluted face, a gauge for positioning a shoe sole over said plate, a plunger cooperating with the plate to impress the sole, and means for shifting said plate to present the flutes thereon to the sole at varying angles.

9. In a device of the class described, the combination with a work support, of a plate mounted on said support, said plate being provided with transverse flutes and an arcuate indenting edge, a gauge for positioning a shoe sole over said plate, a plunger cooperating with the plate to impress the sole, and means for shifting the plate on an axis concentric with said arcuate indenting edge to present the flutes on the plate to the sole at varying angles.

ALBERT F. FROUSSARD.